United States Patent [19]

Francel

[11] Patent Number: 4,554,258

[45] Date of Patent: Nov. 19, 1985

[54] CHEMICAL RESISTANT LEAD-FREE GLASS FRIT COMPOSITIONS

[75] Inventor: Josef Francel, Toledo, Ohio

[73] Assignee: Owens-Illinois, Inc., Toledo, Ohio

[21] Appl. No.: 625,385

[22] Filed: Jun. 28, 1984

[51] Int. Cl.$^4$ ................................................ C03C 3/08
[52] U.S. Cl. ...................................... 501/21; 501/25; 501/26; 501/77; 501/79
[58] Field of Search .................... 501/14, 21, 25, 26, 501/77, 79, 55

[56] References Cited

U.S. PATENT DOCUMENTS

| | | | |
|---|---|---|---|
| 2,942,992 | 6/1960 | Dumesnil | 501/77 |
| 3,927,243 | 12/1975 | Theisen | 501/21 |
| 4,243,421 | 1/1981 | Kume | 501/70 |

*Primary Examiner*—Helen M. McCarthy
*Attorney, Agent, or Firm*—John R. Nelson

[57] ABSTRACT

Glass frit compositions for use in glazes or enamels have a fiber softening point of 535° C. or more and are free of cadmium, lead and arsenic and consist essentially of $Bi_2O_3$—$B_2O_3$—$SiO_2$ with $R_2O$ being 2-8% and RO being 0-9% by weight.

12 Claims, No Drawings

CHEMICAL RESISTANT LEAD-FREE GLASS FRIT COMPOSITIONS

The present invention relates to glass frit compositions that are free of lead, arsenic and cadmium and have good chemical resistance.

BACKGROUND OF THE INVENTION

The present invention relates to lead-free, arsenic-free and cadmium-free glass frit compositions for use in glazing, enameling and for decorating food service ware such as glass tumblers and chinaware. The compositions have increased chemical resistance, especially acid resistance over glass frit compositions of U.S. Pat. No. 4,446,241 issued May 1, 1984 for an invention of Francel, Horn and Stewart, and assigned to the same assignee as the present invention. This patent is incorporated by reference, the patent disclosing and defining properties of the compositions including the fiber softening point, the coefficient of thermal expansion and the chemical resistance such as the alkali resistance and the acid resistance. As therein stated, the acid resistance is measured by a standard test using 4% by weight acetic acid and exposing the samples thereto for 24 hours at room temperature. As also stated therein, the alkali resistance test is made using 9% sodium pyrophosphate at 60° C. for 8 hours.

OBJECTS OF THE INVENTION

It is an object of the present invention to provide a glass frit composition that is free of lead, arsenic and cadmium, the composition having increased chemical resistance including an acid resistance in which the weight percent loss is below about 0.9.

It is an object of the present invention to provide a glass frit composition having increased acid resistance including a weight loss percent of less than about 0.9 in the standard acid test using 4% by weight acetic acid, the composition consisting essentially of $Bi_2O_3$—$B_2O_3$—$SiO_2$ with the amount of $R_2O$ being about 2–8% by weight and RO being about 0–9% by weight.

These and other objects will be apparent from the description that follows and the depending claims.

THE INVENTION

The present invention provides a glass frit composition that is free of lead and arsenic, the composition having a fiber softening point of at least about 535° C. the composition having good chemical resistance and consisting essentially of the following components in parts by weight:

| COMPONENT | PARTS |
|---|---|
| $Bi_2O_3$ | 48–57 |
| $SiO_2$ | 29–38 |
| $B_2O_3$ | 3–8 |
| $R_2O$ | 2–8 |
| $TiO_2$ | 0–2 |
| $ZrO_2$ | 0–8 |
| $Al_2O_3$ | 0–2 |
| BaO | 0–4 |
| ZnO | 0–3 |
| CaO | 0–9 | wherein RO is 0-about 9, $R_2O_3$ is about 57–64, and $RO_2$ is about 32–39, the alkali resistance in weight % loss being below about 0.9 and the acid resistance in weight % loss being below about 0.9.

The preferred ranges of the ingredients are as follows:

| INGREDIENTS | PARTS BY WEIGHT |
|---|---|
| $Bi_2O_3$ | 50–56 |
| $SiO_2$ | 30–34 |
| $B_2O_3$ | 4–5 |
| $R_2O$ | 2–5 |
| $TiO_2$ | 0–2 |
| $ZrO_2$ | 0–3 |
| $Al_2O_3$ | 0–2 |
| RO | 0–7 |
| F | 0–½ |
| $R_2O_3$ | 58–62 |
| $RO_2$ | 32–37 |

$R_2O$ is an alkali metal oxide such as $Na_2O$, $K_2O$ and $Li_2O$ with $Na_2O$ and $K_2O$ generally being at least 50% by weight of the $R_2O$ component. RO is an alkaline earth oxide such as CaO, or ZnO or BaO with CaO generally being present in greater amounts than the others in the RO component.

The improved acid resistance of the frit composition of the present invention is generally high with losses less than about 0.9% by weight and often, preferably, is about 0.7 to 0.75% by weight or below as seen in many of the working examples that follow. The alkali resistance is generally less than about 0.9% by weight and preferably about 0.7 or 0.8% by weight or less.

Following procedures known in the art and as set forth in the previously mentioned U.S. Pat. No. 4,446,241 to Francel et al, raw batch compositions were mixed, melted, fritted and tested to provide the following working examples in which the ingredients are given in parts by weight.

| INGREDIENT | 1 | 2 | 3 | 4 | 5 |
|---|---|---|---|---|---|
| $Bi_2O_3$ | 50 | 57 | 56 | 50 | 50 |
| $SiO_2$ | 29 | 29 | 34 | 29 | 29 |
| $TiO_2$ | 2 | 2 | 2 | 0 | 2 |
| $ZrO_2$ | 3 | 3 | 0 | 3 | 3 |
| $B_2O_3$ | 5 | 5 | 3 | 5 | 5 |
| $Al_2O_3$ | 2 | 2 | 0 | 2 | 2 |
| BaO | 4 | 0 | 0 | 0 | 0 |
| ZnO | 3 | 0 | 0 | 0 | 0 |
| CaO | 0 | 0 | 0 | 9 | 7 |
| $Li_2O$ | 2 | 0 | 0 | 2 | 2 |
| $K_2O$ | 0 | 2 | 2 | 0 | 0 |
| $Na_2O$ | 0 | 0 | 3 | 0 | 0 |
| $R_2O$ | 2 | 2 | 5 | 2 | 2 |
| RO | 7 | 0 | 0 | 9 | 7 |
| $R_2O_3$ | 57 | 64 | 59 | 57 | 57 |
| $RO_2$ | 34 | 34 | 36 | 32 | 34 |
| Weight & Losses | | | | | |
| Alkalies | 0.3 | 0.23 | 0.24 | 0.00 | 0.60 |
| Acid | 0.5 | 0.60 | 0.46 | 0.34 | 0.43 |

| | 6 | 7 | 8 | 9 | 10 |
|---|---|---|---|---|---|
| $Bi_2O_3$ | 50 | 50 | 50 | 50 | 50 |
| $SiO_2$ | 32 | 33 | 38 | 37 | 37 |
| $B_2O_3$ | 7 | 7 | 7 | 5 | 8 |
| $Li_2O$ | 0 | 0 | 0 | 0 | 0 |
| $Na_2O$ | 5 | 7 | 5 | 8 | 5 |
| $K_2O$ | | | | | |
| $R_2O$ | 5 | 7 | 5 | 8 | 5 |
| $TiO_2$ | | | | | |
| $ZrO_2$ | 5 | 3 | 0 | 0 | 0 |
| $Al_2O_3$ | | | | | |
| BaO | | | | | |
| ZnO | | | | | |
| CaO | 1 | 0 | 0 | | |
| F | | | | | |

-continued

| | | | | | |
|---|---|---|---|---|---|
| $R_2O_3$ | 57 | 57 | 57 | 55 | 58 |
| $RO_2$ | 37 | 36 | 38 | 37 | 37 |
| | Loss | Loss | Loss | Loss | Loss |
| Alkalies | 0.45 | 0.50 | 0.82 | 0.56 | 0.00 |
| Acid | 0.87 | 0.85 | 0.13 | 0.38 | 0.00 |
| F.S.P.°C. | 619 | 591 | 581 | 582 | 580 |

| | 11 | 12 | 13 | 14 |
|---|---|---|---|---|
| $Bi_2O_3$ | 53 | 51 | 50 | 48 |
| $SiO_2$ | 32 | 31 | 31 | 31 |
| $B_2O_3$ | 7 | 7 | 7 | 8 |
| $Li_2O$ | 0 | 0 | | |
| $Na_2O$ | 5 | 5 | 5 | 5 |
| $K_2O$ | | | | |
| $R_2O$ | 5 | 5 | 5 | 5 |
| $TiO_2$ | | | | |
| $ZrO_2$ | 3 | 6 | 6 | 8 |
| $Al_2O_3$ | | | | |
| BaO | | | | |
| ZnO | | | | |
| CaO | | | | |
| F | 1 | 0 | | |
| $R_2O_3$ | | | | |
| $RO_2$ | | | | |
| | Loss | Gain | Gain | Loss |
| Alkalies | 0.0 | +0.45 | +0.29 | 0.61 |
| Acids | 0.0 | +0.42 | +0.26 | 0.64 |
| F.S.P.°C. | 572 | 594 | 569 | 598 |

It can be seen from the working examples that substantial amounts of $Bi_2O_3$ in the $Bi_2O_3$—$B_2O_3$—$SiO_2$ glass system provide many advantages including excellent acid resistance that is generally higher with lower losses than the acid resistance of the glass frit compositions of the Francel et al U.S. Pat. No. 4,446,241.

These compositions are resistant to acids, detergents and alkalies which makes them applicable to different substrates exposed to fruit juices, foods, and high alkali detergents. These compositions retain their gloss after exposure to acetic acid (4%) and citric acid (10%). Their weight losses were below 0.9% of the original weight of the fired coating.

Tests in alkali detergents were conducted with these compositions with resultant low losses. The compositions can be fired at and above 590° C. (1100° F.) on variety of substrates—glasses, oxides, and metals. The compositions of the present invention have fiber softening points of at least about 535° C., the range being from about 535° to 609° C. or more, up to about 619° or 625° C.

What is claimed is:

1. A glass frit composition that is free of lead, cadmium and arsenic, the composition having a fiber softening point of at least about 535° C., the composition having good chemical resistance and consisting essentially of the following components in parts by weight per 100:

| COMPONENT | PARTS |
|---|---|
| $Bi_2O_3$ | 48-57 |
| $SiO_2$ | 29-38 |
| $B_2O_3$ | 3-8 |
| $R_2O$ | 2-8 |
| $TiO_2$ | 0-2 |
| $ZrO_2$ | 0-8 |
| $Al_2O_3$ | 0-2 |
| BaO | 0-4 |
| ZnO | 0-3 |
| CaO | 0-9 | wherein RO is 0-about 9, $R_2O_3$ is about 57-64, and $RO_2$ is about 32-39, the alkali resistance in weight % loss being below about 0.9, measured using 9% sodium pyrophosphate at 60° C. for 8 hours, and the acid resistance in weight % loss being below about 0.9, measured using 4% by weight acetic acid for 24 hours at room temperature, RO being at least one of BaO, CaO or ZnO, and $R_2O$ being an alkali metal oxide.

2. A composition as defined in claim 1 in which the composition is as follows:

| COMPONENTS | PARTS |
|---|---|
| $Bi_2O_3$ | 50 |
| $SiO_2$ | 29 |
| $TiO_2$ | 2 |
| $ZrO_2$ | 3 |
| $B_2O_3$ | 5 |
| $Al_2O_3$ | 2 |
| BaO | 4 |
| ZnO | 3 |
| CaO | 0 |
| $Li_2O$ | 2 |
| $K_2O$ | 0 |
| $Na_2O$ | 0 |
| $R_2O$ | 2 |
| RO | 7 |
| $R_2O_3$ | 57 |
| $RO_2$ | 34 |
| Weight % Losses | |
| Alkalies | 0.3 |
| Acid | 0.5 |

3. A composition as defined in claim 1 in which the composition is as follows:

| COMPONENTS | PARTS |
|---|---|
| $Bi_2O_3$ | 57 |
| $SiO_2$ | 29 |
| $TiO_2$ | 2 |
| $ZrO_2$ | 3 |
| $B_2O_3$ | 5 |
| $Al_2O_3$ | 2 |
| BaO | 0 |
| ZnO | 0 |
| CaO | 0 |
| $Li_2O$ | 0 |
| $K_2O$ | 2 |
| $Na_2O$ | 0 |
| $R_2O$ | 2 |
| RO | 0 |
| $R_2O_3$ | 64 |
| $RO_2$ | 34 |
| Weight % Losses | |
| Alkalies | 0.23 |
| Acid | 0.60 |

4. A composition as defined in claim 1 in which the composition is as follows:

| COMPONENTS | PARTS |
|---|---|
| $Bi_2O_3$ | 56 |
| $SiO_2$ | 34 |
| $TiO_2$ | 2 |
| $ZrO_2$ | 0 |
| $B_2O_3$ | 3 |
| $Al_2O_3$ | 0 |
| BaO | 0 |
| ZnO | 0 |
| CaO | 0 |
| $Li_2O$ | 0 |
| $K_2O$ | 2 |
| $Na_2O$ | 3 |
| $R_2O$ | 5 |
| RO | 0 |
| $R_2O_3$ | 59 |

-continued

| COMPONENTS | PARTS |
| --- | --- |
| $RO_2$ | 36 |
| Weight % Losses | |
| Alkalies | 0.23 |
| Acid | 0.60. |

5. A composition as defined in claim 1 in which the composition is as follows:

| COMPONENTS | PARTS |
| --- | --- |
| $Bi_2O_3$ | 50 |
| $SiO_2$ | 29 |
| $TiO_2$ | 0 |
| $ZrO_2$ | 3 |
| $B_2O_3$ | 5 |
| $Al_2O_3$ | 2 |
| BaO | 0 |
| ZnO | 0 |
| CaO | 9 |
| $Li_2O$ | 2 |
| $K_2O$ | 0 |
| $Na_2O$ | 0 |
| $R_2O$ | 2 |
| RO | 9 |
| $R_2O_3$ | 57 |
| $RO_2$ | 32 |
| Weights % Losses | |
| Alkalies | 0.00 |
| Acid | 0.34. |

6. A composition as defined in claim 1 in which the composition is as follows:

| COMPONENTS | PARTS |
| --- | --- |
| $Bi_2O_3$ | 50 |
| $SiO_2$ | 29 |
| $TiO_2$ | 2 |
| $ZrO_2$ | 3 |
| $B_2O_3$ | 5 |
| $Al_2O_3$ | 2 |
| BaO | 0 |
| ZnO | 0 |
| CaO | 7 |
| $Li_2O$ | 2 |
| $K_2O$ | 0 |
| $Na_2O$ | 0 |
| $R_2O$ | 2 |
| RO | 7 |
| $R_2O_3$ | 57 |
| $RO_2$ | 34 |
| Weight % Losses | |
| Alkalies | 0.60 |
| Acid | 0.43. |

7. A composition as defined in claim 1 in which the composition is as follows:

| COMPONENTS | PARTS |
| --- | --- |
| $Bi_2O_3$ | 50 |
| $SiO_2$ | 32 |
| $B_2O_3$ | 7 |
| $Li_2O$ | 0 |
| $Na_2O$ | 5 |
| $K_2O$ | 0 |
| $R_2O$ | 5 |
| $TiO_2$ | 0 |
| $ZrO_2$ | 5 |
| $Al_2O_3$ | 0 |
| BaO | 0 |
| ZnO | 0 |
| CaO | 1 |
| F | 0 |

-continued

| COMPONENTS | PARTS |
| --- | --- |
| $R_2O_3$ | 57 |
| $RO_2$ | 37 |
| Weight % Losses | |
| Alkalies | 0.45 |
| Acid | 0.87. |

8. A composition as defined in claim 1 in which the composition is as follows:

| COMPONENTS | PARTS |
| --- | --- |
| $Bi_2O_3$ | 50 |
| $SiO_2$ | 37 |
| $B_2O_3$ | 8 |
| $Li_2O$ | 0 |
| $Na_2O$ | 5 |
| $K_2O$ | 0 |
| $R_2O$ | 5 |
| $TiO_2$ | 0 |
| $ZrO_2$ | 0 |
| $Al_2O_3$ | 0 |
| BaO | 0 |
| ZnO | 0 |
| CaO | 0 |
| F | 0 |
| $R_2O_3$ | 58 |
| $RO_2$ | 37 |
| Weight % Losses | |
| Alkalies | 0.00 |
| Acid | 0.00. |

9. A composition as defined in claim 1 in which the composition is as follows:

| COMPONENTS | PARTS |
| --- | --- |
| $Bi_2O_3$ | 51 |
| $SiO_2$ | 31 |
| $B_2O_3$ | 7 |
| $Li_2O$ | 0 |
| $Na_2O$ | 5 |
| $K_2O$ | 0 |
| $R_2O$ | 5 |
| $TiO_2$ | 0 |
| $ZrO_2$ | 6 |
| $Al_2O_3$ | 0 |
| BaO | 0 |
| ZnO | 0 |
| CaO | 0 |
| F | 0 |
| $R_2O_3$ | 58 |
| $RO_2$ | 37 |
| Weight % Losses | |
| Alkalies | +0.45 |
| Acid | +0.42. |

10. A composition as defined in claim 1 in which the composition is as follows:

| COMPONENTS | PARTS |
| --- | --- |
| $Bi_2O_3$ | 50 |
| $SiO_2$ | 31 |
| $B_2O_3$ | 7 |
| $Li_2O$ | 0 |
| $Na_2O$ | 5 |
| $K_2O$ | 0 |
| $R_2O$ | 5 |
| $TiO_2$ | 0 |
| $ZrO_2$ | 6 |
| $Al_2O_3$ | 0 |
| BaO | 0 |
| ZnO | 0 |
| CaO | 0 |

-continued

| COMPONENTS | PARTS |
|---|---|
| F | 0 |
| $R_2O_3$ | 57 |
| $RO_2$ | 37 |
| Weight % Losses | |
| Alkalies | +0.29 |
| Acid | +0.26 . |

11. A composition as defined in claim 1 in which the composition is as follows:

| COMPONENTS | PARTS |
|---|---|
| $Bi_2O_3$ | 48 |
| $SiO_2$ | 31 |
| $B_2O_3$ | 8 |
| $Li_2O$ | 0 |
| $Na_2O$ | 5 |
| $K_2O$ | 0 |
| $R_2O$ | 5 |
| $TiO_2$ | 0 |
| $ZrO_2$ | 8 |
| $Al_2O_3$ | 0 |
| BaO | 0 |
| ZnO | 0 |
| CaO | 0 |
| F | 0 |
| $R_2O_3$ | 56 |
| $RO_2$ | 39 |
| Weight % Losses | |
| Alkalies | 0.61 |

| COMPONENTS | PARTS |
|---|---|
| Acid | 0.64 . |

12. A glass frit composition that is free of lead, cadmium and arsenic, the composition having a fiber softening point of at least about 535° C., the composition having excellent chemical resistance and consisting essentially of the following components in approximate parts by weight per 100:

| COMPONENTS | PARTS |
|---|---|
| $Bi_2O_3$ | 50–56 |
| $SiO_2$ | 30–34 |
| $B_2O_3$ | 4–5 |
| $R_2O$ | 2–5 |
| $TiO_2$ | 0–2 |
| $ZrO_2$ | 0–3 |
| $Al_2O_3$ | 0–2 |
| RO | 0–7 |
| F | 0–½ |
| $R_2O_3$ | 58–62 |
| $RO_2$ | 32–37, | the alkali resistance in weight % loss no more than about 0.8, measured using 9% sodium pyrophosphate at 60°C. for 8 hours, and the acid resistance in weight % loss being no more than about 0.75, measured using 4% by weight acetic acid for 24 hours at room temperature, at least one of BaO, CaO or ZnO, and $R_2O$ being an alkali metal oxide.

* * * * *